(12) United States Patent
Bernabeu-Auban et al.

(10) Patent No.: US 7,774,405 B2
(45) Date of Patent: *Aug. 10, 2010

(54) COORDINATION OF SET ENUMERATION INFORMATION BETWEEN INDEPENDENT AGENTS

(75) Inventors: Jose M. Bernabeu-Auban, Sammamish, WA (US); Frank V. Peschel-Gallee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

This patent is subject to a terminal disclaimer.

(21) Appl. No.: 11/130,300

(22) Filed: May 16, 2005

(65) Prior Publication Data

US 2006/0259541 A1    Nov. 16, 2006

(51) Int. Cl.
G06F 15/16    (2006.01)
(52) U.S. Cl. ...................... 709/202; 709/229
(58) Field of Classification Search .................. 709/202
See application file for complete search history.

(56) References Cited

U.S. PATENT DOCUMENTS

| | | | |
|---|---|---|---|
| 5,446,901 A | 8/1995 | Owicki et al. | |
| 5,802,590 A | 9/1998 | Draves | |
| 5,907,675 A | 5/1999 | Aahlad | |
| 5,956,509 A | 9/1999 | Kevner | |
| 6,119,115 A | 9/2000 | Barr | |
| 6,138,251 A | 10/2000 | Murphy et al. | |
| 6,289,390 B1 | 9/2001 | Kavner | |
| 6,338,063 B1 | 1/2002 | Barr | |
| 6,381,628 B1 | 4/2002 | Hunt | |
| 6,381,653 B1 | 4/2002 | Feray et al. | |
| 6,418,464 B1 | 7/2002 | Minow | |
| 7,043,733 B2 | 5/2006 | Limprecht et al. | |
| 7,043,734 B2 | 5/2006 | Limprecht et al. | |
| 7,062,770 B2 | 6/2006 | Limprecht et al. | |

(Continued)

FOREIGN PATENT DOCUMENTS

WO    WO 2006/125003    11/2006

(Continued)

OTHER PUBLICATIONS

Mitchell, J.G. et al., "An Overview of the Spring System", Comcon: Digest of Technical Papers, 1994, 39, 122-131.*

(Continued)

*Primary Examiner*—Vivek Srivastava
*Assistant Examiner*—Ryan J Jakovac
(74) *Attorney, Agent, or Firm*—Woodcock Washburn LLP

(57) ABSTRACT

A type server on a first machine assigns a sequential small integer identifier of fixed length to lengthy information. Identifying information using a small integer identifier provides efficiencies in communication between processes on a single machine as well as efficiencies in communication between processes on different machines. Storage of this information is also more efficient. The information so identified may be, for example, interface type. The small integer identifier assigned to the interface types may be assigned in a set enumeration scheme, that is the first interface type encountered when generating a list or table of interfaces types may be assigned the integer identifier "1", the second "2" and so on. Similarly, the small integer identifiers may be assigned whenever a new interface type is encountered during execution. A translation table including interface type name and interface type identifier for may be generated.

12 Claims, 4 Drawing Sheets

U.S. PATENT DOCUMENTS

| | | | |
|---|---|---|---|
| 7,076,784 | B1 | 7/2006 | Russell et al. |
| 7,171,672 | B2 | 1/2007 | Just |
| 7,200,862 | B2 | 4/2007 | Murching et al. |
| 7,233,972 | B2 | 6/2007 | Minow |
| 7,237,237 | B2 | 6/2007 | Foti |
| 7,379,460 | B2 | 5/2008 | Balakrishnan |
| 7,386,859 | B2 | 6/2008 | Sandadi et al. |
| 7,434,228 | B2 | 10/2008 | Bernabeu-Auban et al. |
| 7,434,235 | B2 | 10/2008 | Bernabeu-Auban et al. |
| 7,441,252 | B2 | 10/2008 | Li et al. |
| 7,581,232 | B2 | 8/2009 | Bernabeu-Auban et al. |
| 7,607,142 | B2 | 10/2009 | Bernabeu-Auban et al. |
| 2004/0083483 | A1* | 4/2004 | Yamamoto et al. .......... 719/316 |
| 2004/0205771 | A1 | 10/2004 | Sudarshan et al. |
| 2005/0091214 | A1 | 4/2005 | Probert et al. |
| 2005/0193392 | A1 | 9/2005 | Carusi et al. |
| 2006/0259488 | A1 | 11/2006 | Bernabeu-Auban et al. |

FOREIGN PATENT DOCUMENTS

| | | |
|---|---|---|
| WO | WO 2006/125004 | 11/2006 |

OTHER PUBLICATIONS

Mitchell, J.G. et al., "An Overview of the Spring System", *Compcon: Digest of Technical Papers*, 1994, 39, 122-131.

Bevan, D., "An efficient reference counting solution to the distributed garbage collection problem," *Parralel Computing*,1989, 9,179-192.

United States Patent and Trademark Office: Non-Final Office Action dated Jun. 24, 2008, U.S. Appl. No. 11/130,308.

United States Patent and Trademark Office: Final Office Action dated Jan. 7, 2009, U.S. Appl. No. 11/130,308.

United States Patent and Trademark Office: Notice of Allowance dated May 29, 2009, U.S. Appl. No. 11/130,308.

PCT International Preliminary Report on Patentability issued Mar. 10, 2009, in corresponding International Application No. PCT/US2006/019090.

PCT International Search Report mailed Jun. 20, 2008, in corresponding International Application No. PCT/US2006/019090.

United States Patent and Trademark Office: Non-Final Office Action dated Dec. 31, 2007, U.S. Appl. No. 11/129,847.

United States Patent and Trademark Office: Notice of Allowance dated Aug. 1, 2008, U.S. Appl. No. 11/129,847.

United States Patent and Trademark Office: Non-Final Office Action dated Aug. 11, 2008, U.S. Appl. No. 11/129,848.

United States Patent and Trademark Office: Final Office Action dated Mar. 17, 2009, U.S. Appl. No. 11/129,848.

United States Patent and Trademark Office: Notice of Allowance dated Aug. 21, 2009, U.S. Appl. No. 11/129,848.

PCT International Preliminary Report on Patentability issued Mar. 10, 2009, in corresponding International Application No. PCT/US2006/019092.

PCT International Search Report mailed Jul. 3, 2008, in corresponding International Application No. PCT/US2006/019092.

United States Patent and Trademark Office: Non-Final Office Action dated Dec. 31, 2007, U.S. Appl. No. 11/130,293.

United States Patent and Trademark Office: Notice of Allowance dated Jul. 10, 2008, U.S. Appl. No. 11/130,293.

United States Patent and Trademark Office: Non-Final Office Action dated Nov. 24, 2008, U.S. Appl. No. 11/130,301.

United States Patent and Trademark Office: Notice of Allowance dated Jun. 8, 2009, U.S. Appl. No. 11/130,301.

U.S. Appl. No. 11/130,301: Notice of Allowance dated Jan. 19, 2010.

\* cited by examiner

COORDINATION OF SET ENUMERATION INFORMATION BETWEEN INDEPENDENT AGENTS

CROSS-REFERENCE TO RELATED CASES

This application is related in subject matter to U.S. patent application Ser. No. 11/130,308, entitled "Coordinating Reference Counting Between Entities Executing Within Separate Address Spaces" filed May 16, 2005, now U.S. Pat. No. 7,581,232, U.S. patent application Ser. No. 11/129,848, entitled "A Cancellation Mechanism for Cooperative Systems" filed May 16, 2005, now U.S. Pat. No. 7,607,142, U.S. patent application Ser. No. 11/130,301, entitled "Self-Registering Objects for an Inter-Process Communication Mechanism" filed May 16, 2005, and U.S. patent application Ser. No. 11/129,847, entitled "Structuring An Operating System Using A Service Architecture" filed May 16, 2005, and U.S. patent application Ser. No. 11/130,293, entitled "Type Server Caching The Proxy/Stub Generation" filed May 16, 2005, now U.S. Pat. No. 7,434,235.

FIELD OF THE INVENTION

The invention relates to sharing resources in computer systems and in particular to a mechanism that coordinates set enumeration information between independent agents.

BACKGROUND OF THE INVENTION

A standard way to communicate between two processes A and B (running on the same machine or running on different machines) is to send a message. Often, for example, it is desirable to enable process A to send a message to process B asking process B to execute code on behalf of process A. Typically, process A must have knowledge of a port or contact point for process B in order to do this.

One way to enable process A to call process B is via a remote procedure call (RPC). A remote procedure call enables a process on one computer to cause code to be executed in another process on the same or on a different computer, without requiring explicit code to be written by a developer or programmer to perform that particular call. An RPC is initiated by the caller process (client) sending a request message to a remote system or second process (server) to execute a certain procedure using supplied arguments. A result message is returned to the caller. For example, in a remote procedure call, a function call may be made by process A, in which the name of the procedure that process B is to execute on behalf of process A and a set of parameters for the procedure, are specified. Process B executes the code and returns a message to process A. When the code in question is written using principles of object-oriented programming, RPC is sometimes referred to as remote invocation or remote method invocation.

A remote procedure call typically follows a particular protocol (another way of saying this is "it uses a particular interface") so that potentially unrelated processes can communicate. The protocol or interface define the methods and the values which the processes agree upon in order to cooperate.

The procedure of transforming the function call into a message is called marshalling. Marshalling may include gathering data from one or more applications or non-contiguous sources in computer storage, putting the data pieces into a message buffer, and organizing or converting the data into a format that is prescribed for a particular receiver or programming interface. Marshalling typically converts what the code in process A sees as a function call into a message to be sent to process B. The message typically includes the name of the function and a set of parameters, coded in a way that process B understands. Process B receives the message and has to transform the message into a call to process B's internal function. The process of converting a message into a function call is called unmarshalling. The piece of code that performs marshalling in process A is called a proxy and typically resides in the client process. The corresponding piece of code on the server side that performs unmarshalling is called a stub.

Within the context of object oriented programming, process A and process B can be viewed as objects encapsulating data and functions. Some well-known technologies that take this approach are Sun Microsystem's JAVA and Microsoft's COM and DCOM. That is, process B may be viewed as a container for one or multiple objects, whose methods are the functions invoked by process A. In object oriented systems, therefore, process A invokes a method of a particular object of process B instead of invoking a function in process B. To do this, process A must have some way of identifying the object in process B that process A wishes to invoke.

The data stored in process A which enables process A to identify the object of process B is known as a reference to the object. The reference stores information concerning how to locate the object: that is, the reference must be sufficient to identify the process and within the process to identify the object whose method is to be invoked.

It is often desirable to share resources within a computer system. As described above, one convenient way to share resources is through an interface that provides programmatic access to the shared resource. The program responsible for the resource is called the server and employs a stub program to handle access requests for the particular type of resource being shared. The program seeking access is called the client and employs a proxy program to make the request for the particular type of resource being requested When lengthy pieces of information are exchanged between processes on the same or on different computers, or are stored, it is often helpful to compress these lengthy pieces of information from an arbitrary length into a smaller fixed-size integer identifier. One way to do so is to assign a sequential small integer to each piece of information as it is encountered. The process of doing so is often referred to as set enumeration.

For example, suppose descriptions of types of data being exchanged (such as interface type name) are passed in messages. To assign a sequential, small integer to be used as an interface type identifier instead of using the lengthy interface type name, a sequential integer could be assigned to each interface type as it is encountered, either as a list of interface types are generated or as interface types are accessed during execution. In other words, a first interface type name encountered or accessed in a particular execution may be assigned the type identifier "1", the next one "2" and so on. When the interface type names are assigned identifiers using the same scheme (for example, by the same agent or module within the same machine in the same execution), always identifying a particular interface type with the same small number is not particularly challenging. When, however, the same interface type is given different identifiers because the interface type identifiers are assigned by different agents within different machines, using different access sequences in different executions, matching up the interface type identifiers becomes a non-trivial exercise. It would be helpful if there were an efficient mechanism to solve this problem.

SUMMARY OF THE INVENTION

A type server or enumerator on a first machine assigns a sequential small integer identifier of fixed length to information which may be lengthy and of arbitrary length. Identifying information using a small integer identifier is likely to provide efficiencies in communication between processes on a single machine as well as efficiencies in communication between processes on different machines. Storage of this information may also be more efficient. The information so identified may be, for example, interface type. The small integer identifiers assigned to the interface types may be assigned in a set enumeration scheme, that is the first interface type encountered when generating a list or table of interfaces types may be assigned the integer identifier "1", the second "2" and so on. Similarly, the small integer identifiers may be assigned whenever a new interface type is encountered during execution. An enumeration table including interface type name and interface type identifier may be generated to store this information.

When a message is sent from one machine to another machine, the small integer identifier assigned to a particular interface type will not be the same in the majority of cases because of different interface type sources and different execution paths. To relate the small integer identifier of a particular interface type on one machine to the small integer identifier assigned to that interface type on another machine, a translation table on each machine is updated to include the corresponding integer identifier for the interface type for the second machine. This approach is repeated for all machines in the system.

A message including interface type identifier information that is to be sent from one machine to another machine is sent first to a front process. The front process determines if the corresponding interface type identifier information for the second machine is available. If it is, the interface type identifier for the first machine is replaced by the interface type identifier for the second machine. If this information is not available, the information is requested from the second machine and when it is received, the translation tables on one or both machines are updated. Eventually, all the translation information will be stored in the translation table(s) and there will no longer be a need to request this information from the second machine.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

When a message including type interface identifier information is sent from one machine (e.g., machine 1) to another machine (e.g., machine 2), there is no guarantee that the identifier assigned to the interface type on machine A is the same as the identifier assigned to the interface type on machine 2 In accordance with the invention, a mechanism is provided that generates a translation table for each machine. In some embodiments of the invention, the translation table includes the following information: interface type name, interface type identifier for machine A, interface type identifier for machine 2 and so on for each machine in the computer system.

When a message is to be sent from machine 1 to machine 2 and the message includes interface type identifier information, the message is first sent to a front process on machine 1. The front process accesses the translation table on machine 1 and replaces the interface type identifier of machine 1 with the interface type identifier of machine 2. If the interface type identifier information for machine 2 for the interface type is not in the translation table, the front process may send a message requesting this information from machine 2. In some embodiments of the invention, the form that this message to machine 2 takes is: interface name, interface type identifier for machine 1. The front process on machine 2 may receive the message, save the interface type identifier for machine 1 in its translation table and return the interface type identifier for machine 2 for the interface type name. The front process on machine 1 may receive this information from machine 2 and save the interface type identifier for machine 2 in machine 1's translation table. This process may be performed as a part of method invocation or may be performed off-line for a number of interface type names.

Exemplary Computing Environment

Figure 1:
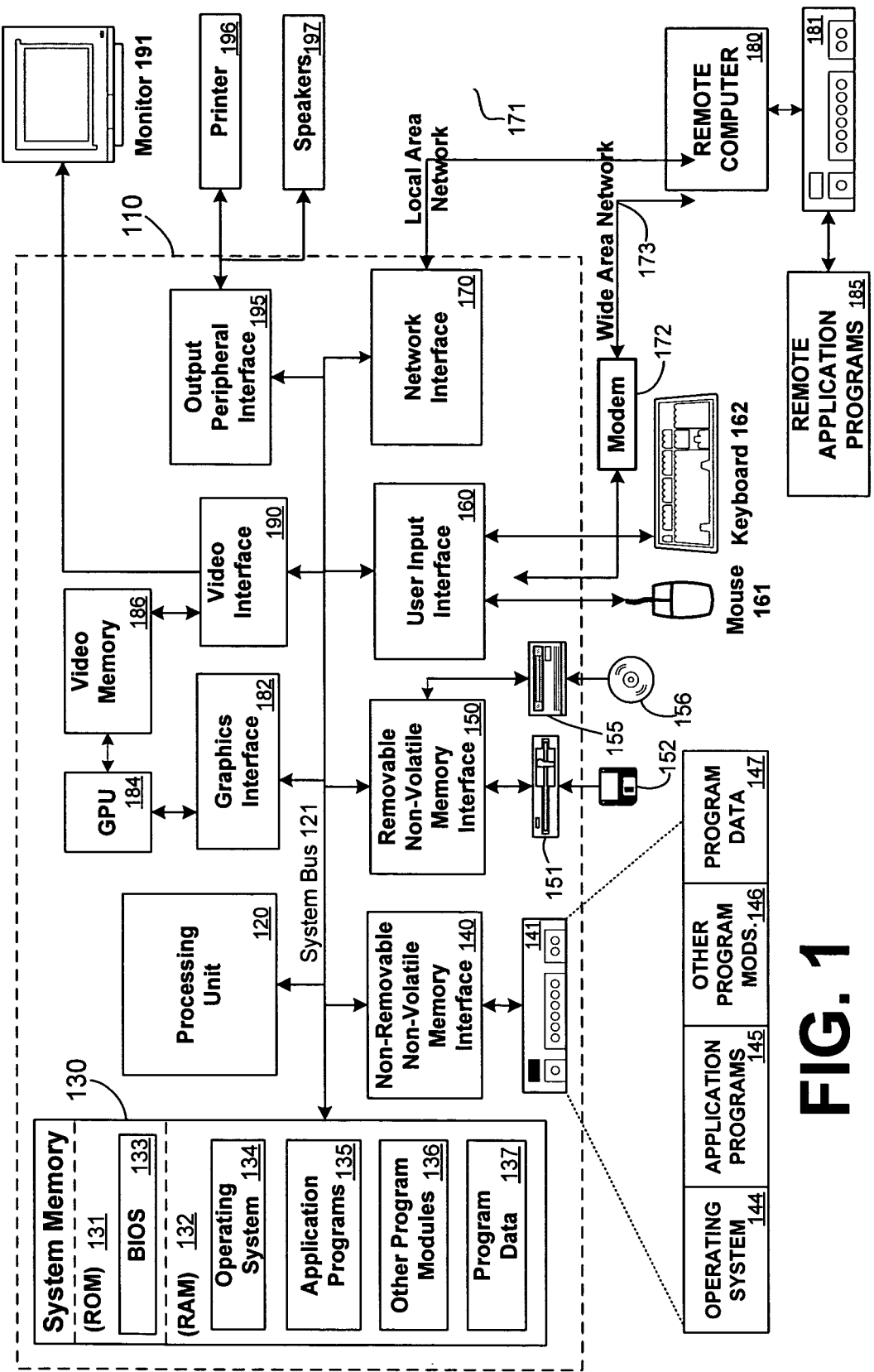
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Coordination of Set Enumeration

Figure 2:
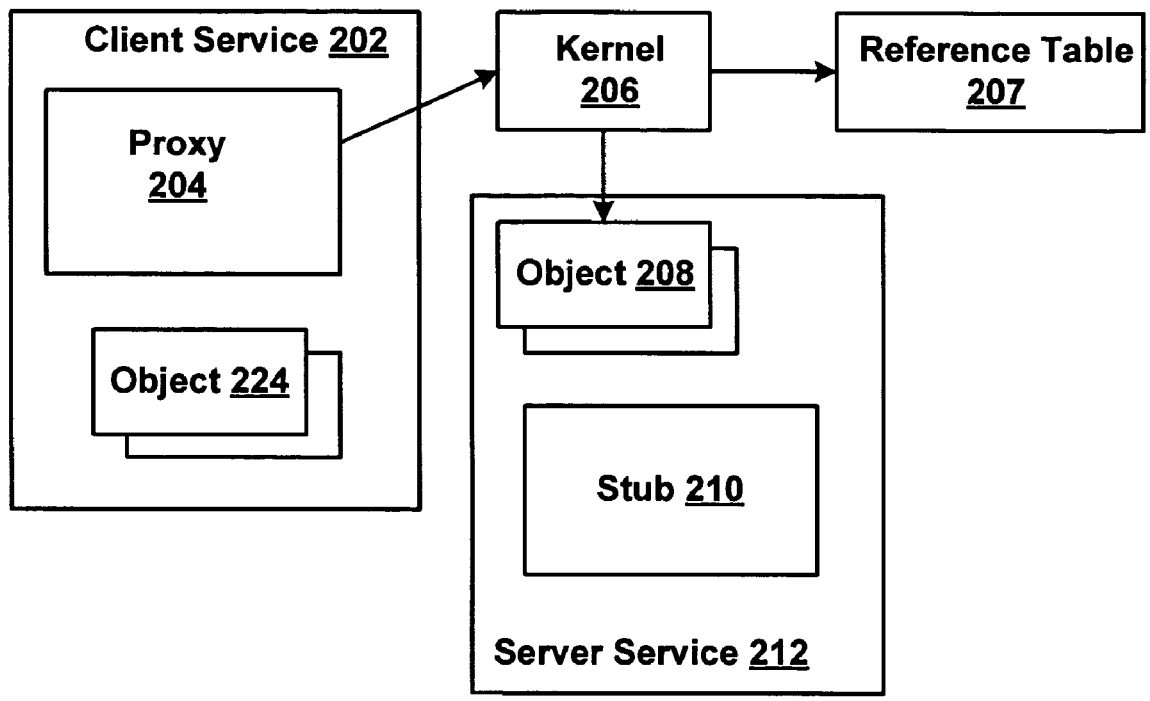
FIG. 2 is a block diagram illustrating relationships between services in an exemplary service-based operating system in accordance with one embodiment of the invention.

FIG. 2 is a block diagram illustrating the relationship of services in a service-based operating system in accordance with some embodiments of the invention. The operating system or portions thereof may reside on or may access one or more computers such as computer 110 described with respect to FIG. 1.

In some embodiments of the invention, the operating system includes entities that are processes, agents, services, components or modules comprising containers for objects or resources that are described through interfaces. FIG. 2 illustrates an exemplary "client" service 202 and an exemplary "server" service 212, although it will be appreciated that any number of client services and server services may exist in the operating system. Moreover, a "client" service in one interaction may act as a "server" service in another: that is, "client" and "server" terminology refers to roles within a particular interaction rather than to intrinsic differences in hardware, software, and so on. Each service may be implemented through the use of one or more objects. For example, in FIG. 2, the client service 202 includes a proxy object 204. The client service 202 may also include one or more other objects or resources, as represented by object 224. Similarly, the server service 212 may include a stub 210 and one or more objects, as represented by object 208. A service may require support from one or more other services and the code specifying the service may require the loading of specific run-time support to run correctly. Services may reside in the same address space in the local machine or in a computer of a computer network. Services alternatively may reside in different address spaces in the local machine or on different computers of a computer network.

A trusted entity may be viewed as a unique distinctive process, module, component, agent or service that mediates communications between processes in the system. In some embodiments the trusted entity is able to distinguish between data parameters and reference parameters in messages passed between processes. In some embodiments the trusted entity has a trusted channel to every agent, service, module, component or process for mediating resource access and reference. Communications with the trusted entity therefore are secure, meaning that processes other than the trusted entity are unable to access or modify transmissions or messages sent between processes. Moreover, the trusted entity may be capable of identifying the originator of a message.

In some embodiments of the invention, the trusted entity is the kernel 206. The kernel 206 can implement and expose its objects (not shown) to other services, such as to services 202 and 212 in FIG. 2. In some embodiments of the invention, the kernel 206 is trusted code. In some embodiments of the invention, the only trusted code is the kernel 206. In some embodiments, to avoid forgery of object references, only trusted code is able to manipulate an object reference. Hence in some embodiments of the invention, only the kernel 206 is able to manipulate an object reference. A service that holds a reference to an object refers to the reference by a representation referred to herein as a reference or as a local reference id. In some embodiments of the invention, the local reference id is understood only by the kernel 206. Hence, for example, a communication sent by client service 202 to a server service 212 invoking a method of object 208 would be mediated by kernel 206. Kernel 206 in some embodiments of the invention, creates and maintains one or more reference tables, as represented by reference table 207 in FIG. 2, to resolve the object reference received from client service 202 to the address of an object 208 to be invoked.

A service may communicate with another service by sending a method invocation to another object via an object reference (e.g., via a remote call). All communications among services are assumed to be and are treated as though they are remote. The client and server services may be in separate (remote) containers or may be co-located in the same container but in either case, the semantics of the call is remote.

A service interface may be specified in an interface definition language or via a contract. In some embodiments of the invention, a subset of an existing language, such as but not limited to C#, is used to define the contract. In some embodiments of the invention, a subset of the application implementation language, such as but not limited to C#, is used to define the interfaces. A service written in C# therefore will seamlessly integrate with the C# contract without requiring the mapping necessitated in traditional systems which use an IDL language for contracts. Services written in other languages such as for example, unmanaged C++ may have a translation table which maps constructs from the C# interface to constructs in C++. Resultant C++ services can interoperate with the C# service as long as the system service model and interface definitions are not violated.

Services may be mapped in a one to one relation to an address space. If such is the case, protection ensues as a consequence of the address space provided by the memory management unit. Alternatively, in some embodiments, multiple services can be located within the same address space. In this case, protection is obtained by a managed code run-time (such as, for example, Microsoft's CLR or Common Language Runtime). Services communicate with each other independent of their location.

Failure and security boundaries in the system may exist at the service level and may be reinforced by hardware protection at the address space and machine levels. Service recovery actions including the ability to restart, and dependency tracking are provided by the operating system. Optimizations may accrue for services that are located within the same address space.

A method invocation can only be interpreted by the receiving object. The receiving object decides what action or actions are to be taken, based on the information passed with the invocation. The information passed may include specific data structures and/or references the invoker passes to the object being invoked.

The set of invocations an object accepts through a particular reference and the way the object is supposed to react to such an invocation is referred to as the interface supported by the object through that reference. Hence, the kernel will not necessarily know what the particular interface implemented by a referenced object is and does not need access to that information. It will be appreciated that it is possible to have different references designating the same object implementation through different interfaces.

An object in some embodiments is an implementation of an interface within some service and is an independent unit of failure. An object may be expressed and coded in any programming language capable of passing parameters and control.

An object reference in some embodiments identifies the object to which the reference refers and is not able to be forged. A reference confers to the holder the authority to invoke any of the methods of the interface for which the reference to the object was created. An object reference may be revoked and may be passed (optionally with restrictions) to another service or to other services as an argument of an invocation or as return results.

Use of an interface so defined enables the definition of a class implementing the interface and whose method implementations are stubs which perform the task of parameter marshalling. Instances of such a class are herein referred to as proxies, the proxies sitting in for the actual objects to which they refer and having the same interface.

Figure 3:
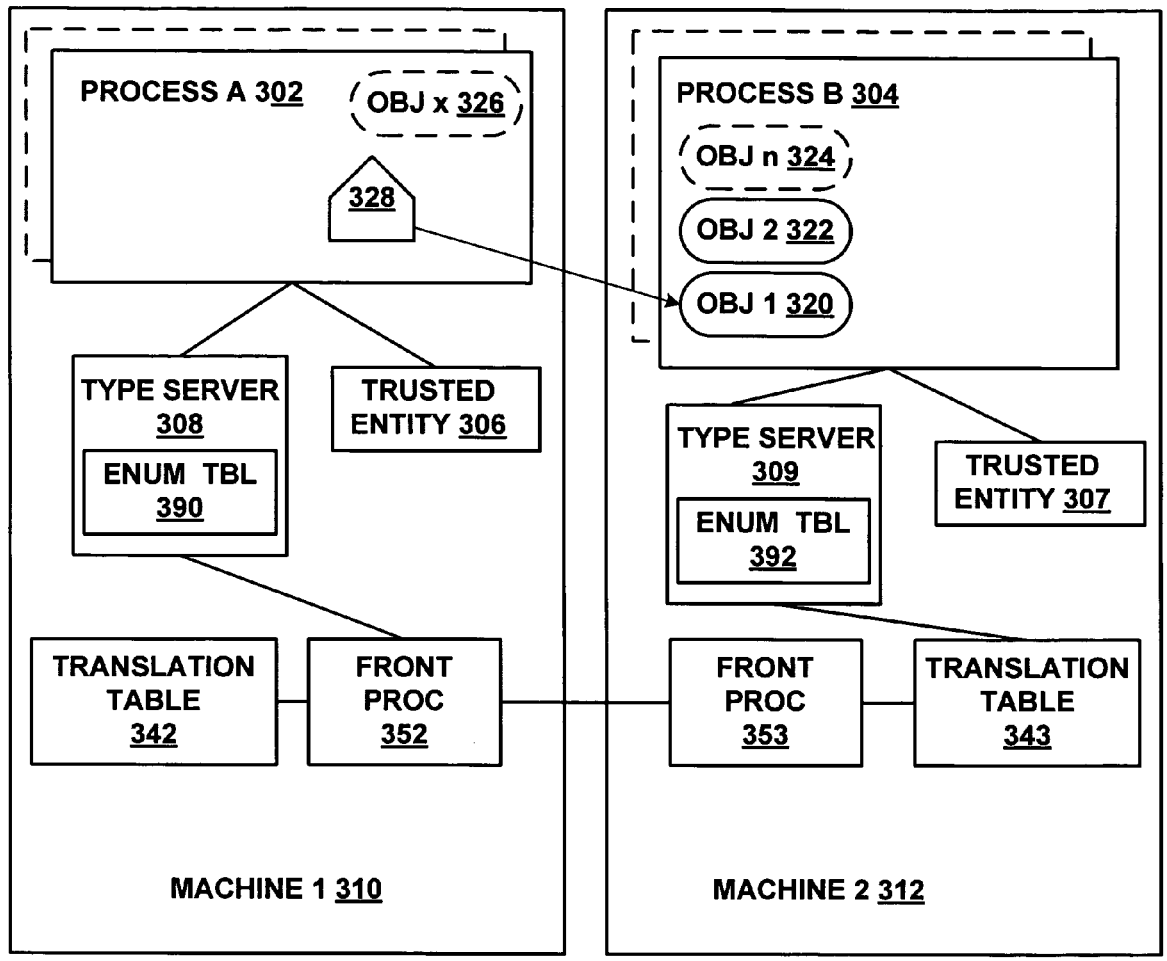
FIG. 3 is a block diagram of an exemplary system for coordinating set enumeration on different machines in accordance with one embodiment of the invention.

FIG. 3 is a block diagram of a system for coordinating set enumeration across different machines in accordance with one embodiment of the invention. It will be appreciated that while FIG. 3 illustrates two machines, the contemplated system may include any number of machines. Machine 1 310, machine 2 312, etc. of FIG. 3 may comprise a computer such as computer 110 described above with respect to FIG. 1.

A system for coordination of set enumeration may include one or more processes, entities, agents or services including one or more objects or resources that may be shared with one or more other processes, agents or services. The system may also include one or more tables for storing information about shared objects or resources, and/or an independent entity, process, service or agent that mediates communications between processes, entities, agents or services. A system for coordination of set enumeration between machines may include one or more of the following elements or components on each machine: a type server (the enumerator), one or more translation tables, a front process, agent, module or component, and one or more processes, agents, modules or components running on the machine. FIG. 3 is a block diagram of an exemplary system for coordination of set enumeration between machines in accordance with one embodiment of the invention. For example, referring to FIG. 3, machine 1 310 may include a type server 308, one or more translation tables 342, a front process 352 and one or more processes such as exemplary process A 302. Machine 1 310 may also include a trusted entity 306 as well as other elements not here shown. Similarly, machine 2 312 may include type server 309, one or more translation tables 343 associated with the type server 309, a front process 353 and one or more processes such as exemplary process B 304. Machine 2 312 may also include a trusted entity 307 as well as other elements not here shown. Process A 302 may act as a client process in any particular interaction or as a server process. Similarly, process B 304 may act as a client process in any particular interaction or as a server process. That is, "client" and "server" terminology refers to roles within a particular interaction rather than intrinsic differences in hardware, software, and so on.

A type server such as type server 308 on machine 1 310 and type server 309 on machine 2 312 in some embodiments of the invention is a component, module or process that may receive a request message from another component, module or process and return a result message to the requestor. The type server may be associated with an enumeration table, list or array that associates the potentially lengthy interface type name with a more compact, fixed length identifier. The enumeration table 390 of type server 308 on machine 1 310 and the enumeration table 392 of type server 309 on each machine 342, 343 may include one or more entries, each entry including an interface type name and interface type identifier for machine 1 310, the corresponding type identifier for machine 2 312, and so on for each machine in the computer system. In some embodiments of the invention the set being enumerated is that of interface names, the type server enumerates that set as it processes contract files as described in U.S. patent application Ser. No. 11/130,293.

In some embodiments of the invention, the type server on a machine may assign a sequential small integer type identifier of a fixed size (e.g., 4 bytes) to each new interface type encountered and may generate an entry for the new interface type in the enumeration table for that machine. It will be apparent that because an interface type is assigned a sequential integer number, the number assigned to a particular interface type depends on the particular execution and will vary from run to run on the same machine and will of course also be different from one execution on machine 1 310 to another execution on machine 2 312. Thus, for example, the same interface type, (say interface type I) may be assigned the number "10" on machine 1 310 and be assigned the number "63" on machine 2 312 or may be assigned the number "10" for one execution and "30" for another execution on the same machine. Alternatively, instead of a sequential small integer assigned as an identifier, the identifier may be generated according to some function or algorithm or randomly generated, the sole requirement being that the integer assigned to the interface type must be unique for that run for that machine.

A front process 352 on machine 1 310 may receive a message from another process such as process A 302 to be passed to exemplary process B 304 on machine 2 312. The message may include parameters carrying interface type identifier information. In accordance with some embodiments of the invention, front process 352 on machine 1 310 may access translation table 342, determine the corresponding type identifier for machine 2 312 for the interface type and replace the interface type identifier for machine 1 310 with the corresponding type identifier for machine 2 312 from the translation table 342 on machine 1 310. (For example, if the interface identifier for interface type I ("10" on machine 1 310) is to be sent to machine 2 312, the front process 352 on machine 1 310 would replace "10" with "63"). If the corresponding type identifier for machine 2 312 is not in the translation table 352, front process 352 on machine 1 310 may send a message to machine 2 312 requesting this information. In some embodiments of the invention, the message sent to machine 2 312 may include one or more list elements. Each list element may include interface type name and interface type identifier assigned to that interface type on machine 1 310. In some embodiments of the invention, the message is received by front process 353 on machine 2 312 which requests this information from its type server 309. A message may be returned from front process 353 on machine 2 312 to front process 352 on machine 1 310. The message may include one or more list elements (in the order of the message received from machine 1 310) comprising the type identifier assigned to the interface type on machine 2 312. Front process 352 on machine 1 310 and front process 353 on machine 2 312 may both update their translation tables 342, 343 with the information provided. It will be apparent that instead of the sending process performing the translation and requesting missing information, the receiving process may perform the translation and request missing information.

Process A 302 and process B 304 may include one or more objects or resources that may be shared. In FIG. 3, process B 304 as illustrated includes object 1 320, object 2 322 . . . object n 324. Similarly, process A 302 as illustrated in FIG. 3 includes exemplary object×326, although it will be appreciated that process A 302 and process B 304 may include any number of objects. Process A 302 may export one or more of its objects (e.g., object×326) to other processes (e.g., to process B). Similarly, process B 304 may export one or more of its objects (e.g., one or more of objects: object 1 320, object 2, 322 . . . object n 324) to other processes (e.g., to process A 302). Process A 302 may import or reference an object that has been exported to it (such as, for example, one or more of objects object 1 320, object2 322 . . . object n 324) by other processes (such as, for example, by process B 304). Similarly, process B 304 may import or reference an object (such as, for example, object ×326) exported to it by other processes (such as, for example, by process A 302). In FIG. 3, process A 302 as illustrated has a reference 328 to object 1 320 of process B 304.

A trusted entity 306 in some embodiments of the invention mediates communications between processes such as those between process A 302 and process B 304 and vice versa. In some embodiments of the invention, trusted entity 306 is the kernel of an operating system. Communication channels between processes and the trusted entity 306 are secure. Furthermore, the trusted entity can identify the originator of a message. The trusted entity 306 may maintain a table of imported and exported object references for each process (not shown). Tables maintained by the trusted entity 306 for each process may include one or more of the following for each object in the table: an index (an even numbered index may indicate that the object is an exported object, an odd numbered index may indicate the object is an imported object), a location of the object in the originating process and an identification of the process to which the object was exported or from which the object was imported.

Figure 4:
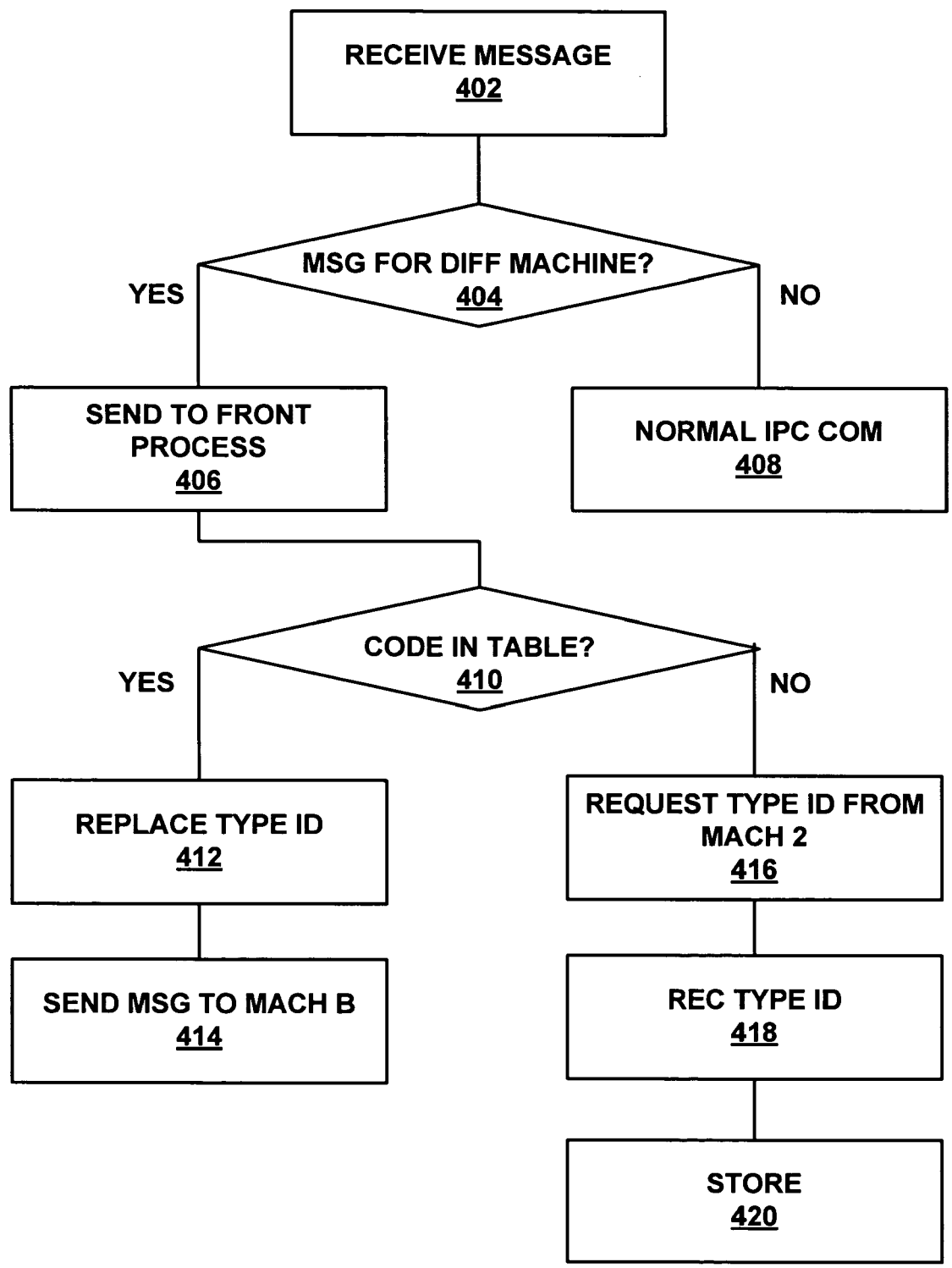
FIG. 4 is a flow diagram of an exemplary system for coordinating set enumeration on different machines in accordance with one embodiment of the invention.

FIG. 4 is a flow diagram of a method for coordination of set enumeration between independent agents in accordance with one embodiment of the invention. At 402 a message (e.g., an inter-process communication or remote procedure call) is prepared for sending. For example, process A 302 on machine 1 310 may decide to send a message to process B 304 on machine 2. At 404, the type of message is determined. For example, it may be determined that this communication is one sent between different processes on different machines. At 408 if the message is for another process in the same machine, normal inter-process communication is performed as described in U.S. patent application 11/130,308, "Coordinating Reference Counting Between Entities Executing Within Separate Address Spaces", U.S. patent application Ser. No. 11/129,848, "A Cancellation Mechanism for Cooperative Systems", U.S. patent application 11/130,301, "Self-Registering Objects for an Inter-Process Communication Mechanism", U.S. patent application 11/129,847, "Structuring An Operating System Using A Service Architecture" and U.S. patent application 11/130,293, "Type Server Caching The Proxy/Stub Generation". For example, it may be determined that the message being sent is from one process in machine 1 310 to another process in machine 1 310, in which can normal inter-process communication will be performed. At 406 if the message is to be sent to a process in another machine, the message is sent to a front process as described above. For example, if it is determined that process A 302 on machine 1 310 is sending a message to process B 304 on machine 2 312, the message will be sent to front process 352 on machine 1 310. At 410 the front process searches a translation table to determine if the corresponding identifier for the receiving machine for the interface type is known. For example, front process 352 on machine 1 310 may search translation table 342 to find the interface type identifier for interface I on machine 2 312 that corresponds to the interface type I identifier on machine 1 310. At 412 if the corresponding identifier is known, the interface type identifier for the sending machine is replaced with the interface type identifier for the receiving machine at 412 and the message is sent to the receiving machine. For example, if the translation table 342 includes an entry for interface type I (interface type identifier 63 on machine 2 312) "10" is replaced with "63" and the message is sent to machine 2 312. At the receiving machine the message is received by the front process for the receiving machine and is passed unchanged into the normal processing path for received messages. If the corresponding interface type identifier is not found for the receiving machine in the sending machine's translation table, a message is sent from the receiving machine to the sending machine requesting the corresponding interface type identifier for the interface type. For example, if the corresponding type identifier for machine 2 312 ("63") was not found in the translation table 342, the front process 352 on machine 1 310 would send a message to machine 2 312, requesting this information. At 418 the corresponding interface type identifier is received at the front process of the sending machine from the receiving machine. For example, "63" would be received at front process 342 on machine 1 310. At 420 the identifier from the sending machine is stored in the translation table on the receiving machine and the identifier from the receiving machine is stored in the translation table on the sending machine. For example, "63" is stored in translation table 342 and "10" is stored at translation table 343. It will be appreciated that alternatively the message could be sent as is at 412 and transformed by front process 353 on machine 2 312.

It will be appreciated that some actions may be performed in a sequence other than that shown in FIG. 4, and may include fewer or more actions than illustrated. That is, the flow diagram of FIG. 4 is exemplary only and is not intended to limit the contemplated invention to the particular sequence or number of actions shown.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for correlating identifiers on different computers comprising:
   a first agent on a first computer that is adapted to receive a message from a second agent on the first computer, wherein the second agent is adapted to send the message to a second computer, the message comprising:
   a first identifier for a resource, wherein the first identifier is a first integer assigned to the resource as the resource is encountered in a process running on the first computer, wherein the resource is identified by a second identifier on the second computer, the second identifier comprising a second integer not equal to the first integer, wherein the first agent on the first machine is adapted to replace the first identifier with the second identifier in the message to be sent to the second computer; and
   a table of entries comprising at least one table entry for correlating between
   the first integer and the second integer, wherein the first agent is adapted to send a request to the second computer for the second identifier when the second identifier is not found in the table of entries.

2. The system of claim 1, wherein the table entry comprises a resource name.

3. The system of claim 1, wherein the table entry comprises the first identifier assigned to the resource on the first computer.

4. The system of claim 1, wherein the table entry comprises the second identifier assigned to the resource on the second computer.

5. The system of claim 1, further comprising a type server, the type server assigning the first identifier to the resource as the resource is encountered in execution.

6. A computer-implemented method for correlating between a first identifier assigned to a resource on a first computer and a second identifier assigned to the resource on a second computer comprising:
   generating a table comprising the first identifier and the second identifier, wherein the first identifier comprises an identifier for the resource for the first computer and the second identifier comprises an identifier for the resource for the second computer;
   replacing, using a first agent on the first computer, the first identifier with the
   second identifier in a message before sending the message to the second computer; and
   requesting, using the first agent on the first computer, the second identifier
   assigned to the resource on the second computer if the second identifier is not found in the table.

7. The method of claim 6, further comprising:
   receiving a message from the first agent on the first computer to be sent to a second agent on the second computer, the message comprising the first identifier.

8. The method of claim 6, further comprising:
   receiving the second identifier from the second computer.

9. The method of claim 8, further comprising:
   storing the first identifier and the second identifier in the table correlating identifiers on the first computer.

10. The method of claim 9, further comprising:
    storing the first identifier and the second identifier in a table correlating identifiers on the second computer.

11. A physical computer-readable storage medium comprising computer-executable instructions for:
    generating a table correlating a first identifier assigned to an interface type on a first computer and a second identifier assigned to the interface type on a second computer;
    receiving a message from a first agent on the first computer to be sent to a second agent on the second computer, the message comprising the first identifier and a interface type name; and
    replacing at the first computer the first identifier with the second identifier from the correlation table assigned to the interface type on the second computer.
    in response to determining that the second identifier assigned to the interface
    type on the second computer is missing from the correlation table, sending a message to the second computer requesting the second identifier;
    receiving the second identifier from the second computer and storing the second identifier in the correlation table;
    generating a second correlation table on the second computer; and
    receiving the message from the first computer, the message comprising the first identifier and storing the first identifier in the second correlation table.

12. The computer-readable medium of claim 11, comprising further instructions for:
    assigning a four-byte integer as the first identifier.

* * * * *